United States Patent [19]

Reim et al.

[11] Patent Number: 4,978,584
[45] Date of Patent: Dec. 18, 1990

[54] MAGNETO-OPTICAL STORAGE MEDIUM

[75] Inventors: Wolfgang Reim; Dieter Weller, both of Erlangen, Fed. Rep. of Germany

[73] Assignee: Siemens Aktiengesellschaft, Berlin & Munich, Fed. Rep. of Germany

[21] Appl. No.: 348,275

[22] Filed: May 5, 1989

[30] Foreign Application Priority Data

May 9, 1988 [DE] Fed. Rep. of Germany ....... 3815848

[51] Int. Cl.$^5$ .............................................. H01F 10/12
[52] U.S. Cl. ................................. 428/611; 428/627; 428/635; 428/672; 428/673; 428/692; 428/693
[58] Field of Search ............... 428/611, 627, 635, 672, 428/673, 676, 681, 692, 693, 694, 900, 928

[56] References Cited

U.S. PATENT DOCUMENTS 4,569,881 2/1986 Freese et al. ..................... 428/900
4,695,510 9/1987 Sawamura et al. ................. 428/694

FOREIGN PATENT DOCUMENTS 108112 5/1986 Japan ..................................... 428/681
93367 4/1987 Japan ..................................... 428/676
398348 1/1974 U.S.S.R. ................................ 428/635

Primary Examiner—Theodore Morris
Assistant Examiner—George Wyszomierski
Attorney, Agent, or Firm—Kenyon & Kenyon

[57] ABSTRACT

A storage medium comprising a multilayer system with at least one magnetic layer, of magneto-optical storage material, and at least one reflector layer, with an index of refraction $n < 1$, which is at least as thick as one of the magnetic layers. The maximum thickness of each of the magnetic layers is inversely proportional to its absorption coefficient, K. In the magneto-optical multilayer system of the present invention, a large Kerr angle $O_K$ is obtained.

20 Claims, 1 Drawing Sheet

4,978,584

MAGNETO-OPTICAL STORAGE MEDIUM

FIELD OF THE INVENTION

The present invention relates to a magneto-optical storage medium comprising several layers with different magnetic properties.

BACKGROUND OF THE INVENTION

Generally magneto-optical storage media consist of an amorphous magnetic alloy, or a polycrystalline alloy, with very small crystallite sizes. Generally, these storage media o contain a rare earth element and at least one transition metal. The storage media are applied in a vacuum to a carrier as a z thin recording layer. The storage of the information results from a thermal change in the magnetic structure of the media. The recording is accomplished by focusing a beam with a high energy density, preferably a laser beam, on the surface of the recording layer. The radiation energy from this beam heats the recording layer, in substantially point-shaped regions, to a temperature above the Curie temperature, $T_C$, or a temperature above the magnetic compensation temperature, to form a pattern of magnetic zones with reversed polarity. After this heating, the plane of polarization of a laser beam with lower energy is rotated upon passage through the recording layer (Faraday effect) or reflection at the recording layer (Kerr effect). Stored information can be read from the recording layer by measuring this angle of rotation, or reflection, $\theta_K$. The signal-to-noise ratio, or the carrier-to-noise ratio, C/N, is approximately proportional to the product of $\theta_k \times \sqrt{R}$, where $\theta_K$ is the Kerr angle and R the reflection factor. With an increase of the Kerr angle $\theta_K$, a correspondingly improved carrier-to-noise ratio, and an increased read-out, are obtained. In addition to a large Kerr angle and a good signal-to-noise ratio, the storage media should have a high coercivity, i.e., an approximately rectangular magnetization loop.

Generally, a multilayer magneto-optical medium contains two different materials, a ferromagnetic material such as cobalt, and a nonmagnetic material, such as copper. These materials are applied, alternating one after the other, as layers with different densities to a substrate. By changing the layer thickness, the wavelength of the maximum Kerr angle, $\theta_K$, can be shifted In this multilayer system, also called an artificial superlattice, however, the Kerr angle $\theta_K$, is always smaller than in an individual layer of the same ferromagnetic material. Multilayer systems such as described in this paragraph are generally discussed in "Journal of the Physical Society of Japan", (Vol. 55, No. 8, August 1986, pages 2539 to 2542), the teachings of which are hereby incorporated by reference.

An object of the invention is a magneto-optical storage medium with a large Kerr angle and high coercivity which makes possible a high data density and a high recording and readout rate.

SUMMARY OF THE INVENTION

According to the present invention this and other objects are achieved by a magneto-optical storage medium, comprising a multilayer system having at least one magnetic layer comprising a magnetic storage material having a maximum thickness inversely proportional to its absorption coefficient K, and at least one reflective layer having an index of refraction, n, less than 1, and a thickness at least as large as the thickness of the magnetic layer. The total thickness, D, of the multilayer system of the present invention will preferably be at least 3/K where K is the absorption coefficient. With the multilayer system of the present invention, a substantially increased Kerr angle $\theta_K$, in the magneto-optical storage medium, is obtained.

The magnetic layers comprise a storage material of high coercivity $H_C$, preferably of at least 1 kG, and more preferably of at least 2 kG, and a sufficiently large Kerr angle $\theta_K$, generally at least 0.2° and preferably at least 0.4°. For example, the magnetic layers may comprise terbium-ion-cobalt, TbFeCo, or ytterbium-terbium-iron-cobalt YbTbFeCo. The magnetic layer may also comprise Gadolinium-terbium-iron-cobalt GdTbFeCo.

The reflector layers may comprise, for example, copper Cu or gold Au, and preferably comprise silver, Ag. Also suitable for the reflector layers of the present invention are reflector layers of thuliumsulfide, TmS, or so called "artificial gold", for example, titaniumnitride, TiN; or Zirconium nitride, ZrN; or hafnium nitride HfN.

DETAILED DESCRIPTION OF THE INVENTION

Figure 1:
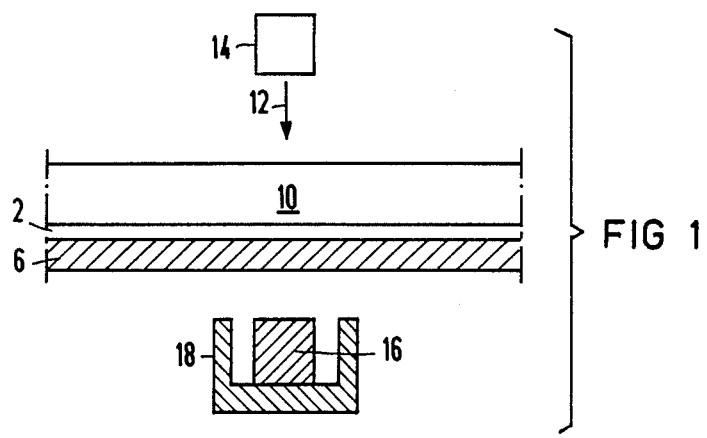
FIG. 1 is a schematic illustration of an embodiment of a magneto-optical storage medium comprising a multilayer system according to the present invention.

According to FIG. 1, a storage medium consists of a multilayer system with a magnetic layer, 2, of magnetic storage material of, for example, terbium-iron-cobalt TbFeCo, which is deposited on a transparent substrate 10, by, for example, sputtering or vapor deposition. Below the magnetic layer, 2, a reflector layer, 6, with an index of refraction, n, less than one is arranged The reflector layer, 6, may comprise, for example, silver Ag. The thickness of the reflector layer, 6, is preferably at least twice the thickness of the magnetic layer, 2. A laser beam, 12, which is provided by a radiation source, 14, permits information to be written into the multilayer system, and also permits the information to be read out again. For writing into the multilayer system, a cylindrical magnet, 16, with a rotation-symmetrical yoke 18 may be utilized. With this multilayer system of the present invention, a substantially increased Kerr angle $\theta_K$ is obtained.

Figure 2:
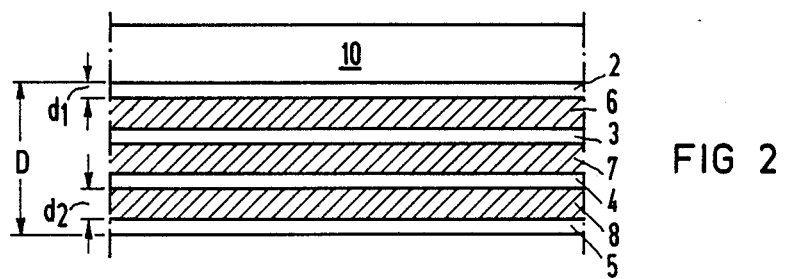
FIG. 2 depicts a preferred embodiment of the multilayer system of the present invention.

According to a particularly advantageous embodiment of the present invention shown in FIG. 2, the multilayer system comprises several magnetic layers 2, 3, 4, and 5, with a reflection layer, 6, 7, and 8 arranged between each magnetic layer. Magnetic layers 2, 3, 4, and 5 have a thickness, "$d_1$", of about 2 to about 20 nm, and preferably about 5 to about 12 nm. Reflector layers 6, 7, and 8 have a thickness "$d$"$_2$ of about 5 to about 60 nm, and preferably about 10 to about 40 nm. The total thickness D of the multilayer system will preferably be at least 3/K, where K is the effective absorption coefficient of the entire multilayer system. With a wavelength of the laser beam, 12, of, for example, 633nm, a Kerr angle, $\theta_K$, of substantially more than 1 is obtained. The Kerr angle, $\theta_k$ and the wavelength of the laser beam, depend on the materials utilized to form the layers.

Figure 3:
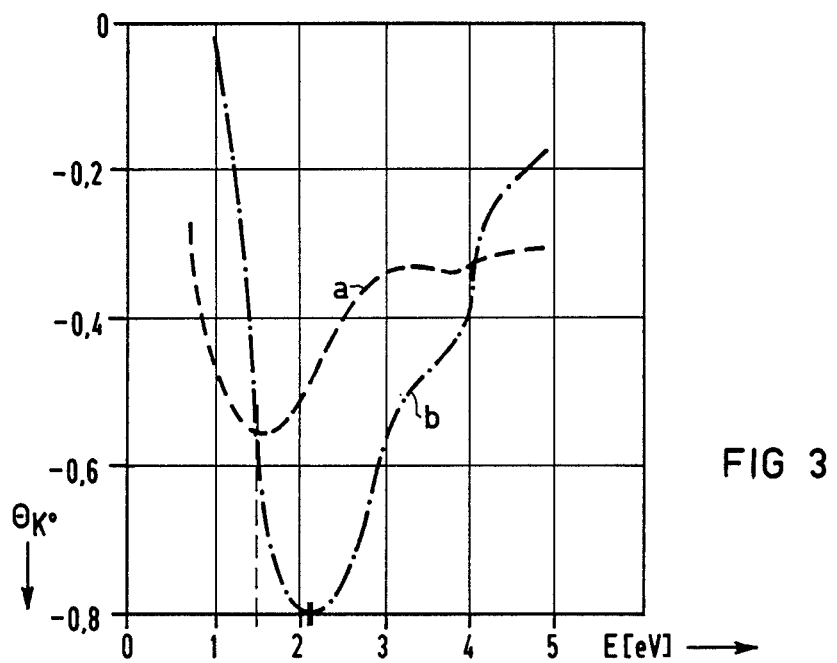
FIG. 3 illustrates, diagramatically the dependence of the maximum Kerr angle $\theta_K$ on the photon energy E.

FIG. 3, shows the Kerr angle, $\theta_K$, plotted versus the photon energy, E in electron volts eV is obtained. With a single layer of iron-cobalt FeCo, a maximum Kerr angle of about 0.55° for a photon energy of about 1.5 eV, as shown by the dashed curve a which corresponds to a wavelength of about 800 nm. Alternatively, the maximum Kerr angle $\theta_K$ is increased to about 0.8° at a photon energy of about 2.1 eV, in the multilayer system depicted in FIG. 2 with magnetic layers 2, 3, 4 and 5 of iron-cobalt,FeCo, with a thickness $d_1$ of about 8 to 10 nm, and reflector layers 6, 7, and 8 of silver Ag, with a thickness $d_2$ of about 15 to 25 nm, with a not-reduced reflectivity R=0.64, as shown by the dashed curve b which corresponds to a wavelength of about 590 nm.

We claim:

1. Magneto-optical storage medium of several layers with different magnetic properties, comprising:
   at least one magnetic layer of a magnetic storage material;
   at least one reflector layer with an index of refraction, n, less than one; wherein the thickness of the reflector layer is at least as large as the thickness of the magnetic layer, and the maximum thickness of the magnetic layer equals 1/K, where K is the absorption coefficient of the magnetic layer, and wherein the reflector layer is selected from the group consisting of silver, Ag; thulium sulfide, Tms; titanium nitride, TiN; zirconium nitride, ZrN; hafnium nitride, HfN; gold, Au.

2. The storage medium of claim 1 wherein the thickness of the reflector layer is at least twice the thickness of the magnetic layer.

3. The storage medium of claim 1 comprising:
   a plurality of said magnetic layers, arranged with a plurality of said reflector layers, wherein each magnetic layer is separated by one of the reflector layers.

4. The storage medium of claim 2 wherein each magnetic layer has the same thickness, and each reflector layer has the same thickness, and the thickness of each reflector layer is at least twice the thickness of each magnetic layer.

5. The storage medium according of claim 2 wherein the plurality of the magnetic layers and the plurality of the reflector layers have a total thickness greater than three divided by the absorption coefficient, K, of the storage medium.

6. The storage medium of claim 2 wherein the magnetic layers comprise terbium-iron-cobalt, TbFeCo.

7. The storage medium of claim 2 wherein the magnetic layers comprise of ytterbium-terbium-iron-cobalt, YbTbFeCo.

8. The storage medium of claim 2 wherein the magnetic layers comprise gadolinium-terbium-iron-cobalt, GdTbFeCo.

9. The storage medium of claim 8, wherein at least one reflector layer comprises gold, Au.

10. The storage medium of claim 2 wherein at least one reflector layer comprises silver Ag.

11. The storage medium of the claim 2 wherein at least one reflector layer comprises thulium sulfide, TmS.

12. The storage medium of claim 2 wherein at least one reflector layer comprises titanium nitride, TiN.

13. The storage medium of claim 2 wherein at least one reflector layer comprises zirconium nitride, ZrN.

14. The storage medium of claim 2 wherein at least one reflector layer comprises hafnium nitride, HfN.

15. A magneto-optical storage medium of several layers with different magnetic properties, comprising:
   a plurality of magnetic layers of a magnetic storage material arranged with;
   a plurality of reflector layers with an index of refraction, n, less than one; wherein the thickness of each reflector layer is at least as large as the thickness of each magnetic layer and the maximum thickness of each magnetic layer equals 1/K, where K is the absorption coefficient of the magnetic layer; and
   wherein each magnetic layer is separated by one of the reflector layers and at least on reflector layer comprises silver, Ag.

16. A magneto-optical storage medium of several layers with different magnetic properties, comprising:
   a plurality of magnetic layers of a magnetic storage material arranged with;
   a plurality of reflector layers with an index of refraction, n, less than one; wherein the thickness of each reflector layer is at least as large as the thickness of each magnetic layer and the maximum thickness of each magnetic layer equals 1/K, where K is the absorption coefficient of the magnetic layer; and
   wherein each magnetic layer is separated by one of the reflector layers and at least on reflector layer comprises thulium sulfide, TmS.

17. A magneto-optical storage medium of several layers with different magnetic properties, comprising:
   a plurality of magnetic layers of a magnetic storage material arranged with;
   a plurality of reflector layers with an index of refraction, n, less than one; wherein the thickness of each reflector layer is at least as large as the thickness of each magnetic layer and the maximum thickness of each magnetic layer equals 1/K, where K is the absorption coefficient of the magnetic layer; and
   wherein each magnetic layer is separated by one of the reflector layers and at least one reflector layer comprises titanium nitride, TiN.

18. A magneto-optical storage medium of several layers with different magnetic properties, comprising:
   a plurality of magnetic layers of a magnetic storage material arranged with;
   a plurality of reflector layers with an index of refraction, n, less than one; wherein the thickness of each reflector layer is at least as large as the thickness of each magnetic layer and the maximum thickness of each magnetic layer equals 1/K, where K is the absorption coefficient of the magnetic layer; and
   wherein each magnetic layer is separated by one of the reflector layers and at least one reflector layer comprises zirconium nitride, ZrN.

19. A magneto-optical storage medium of several layers with different magnetic properties, comprising:
   a plurality of magnetic layers of a magnetic storage material arranged with;
   a plurality of reflector layers with an index of refraction, n, less than one; wherein the thickness of each reflector layer is at least as large as the thickness of each magnetic layer and the maximum thickness of each magnetic layer equals 1/K, where K is the absorption coefficient of the magnetic layer; and
   wherein each magnetic layer is separated by one of the reflector layers and at least one reflector layer comprises hafnium nitride, HfN.

20. A magneto-optical storage medium of several layers with different magnetic properties, comprising:
- a plurality of magnetic layers of a magnetic storage material arranged with;
- a plurality of reflector layers with an index of refraction, n, less than one; wherein the thickness of each reflector layer is at least as large as the thickness of each magnetic layer and the maximum thickness of each magnetic layer equals 1/K, where K is the absorption coefficient of the magnetic layer; and
- wherein each magnetic layer is separated by one of the reflector layers and at least one reflector layer comprises gold, Au.

* * * * *